US012752550B2

(12) United States Patent
Frischholz et al.

(10) Patent No.: US 12,752,550 B2
(45) Date of Patent: Oct. 6, 2026

(54) METHOD FOR OPERATING A SYSTEM HAVING A CORRUGATOR AND A PRINTING MACHINE, AND SYSTEM

(71) Applicant: BHS Corrugated Maschinen-und Anlagenbau GmbH, Weiherhammer (DE)

(72) Inventors: Josef Frischholz, Theisseil (DE); Martin Hägler, Wernberg-Köblitz (DE)

(73) Assignee: BHS Corrugated Maschinen- Und Anlagenbau GmbH, Weiherhammer (DE)

( * ) Notice: Subject to any disclaimer, the term of this patent is extended or adjusted under 35 U.S.C. 154(b) by 112 days.

(21) Appl. No.: 18/845,569

(22) PCT Filed: Apr. 24, 2023

(86) PCT No.: PCT/EP2023/060571
§ 371 (c)(1),
(2) Date: Sep. 10, 2024

(87) PCT Pub. No.: WO2023/237253
PCT Pub. Date: Dec. 14, 2023

(65) Prior Publication Data
US 2025/0196513 A1 Jun. 19, 2025

(30) Foreign Application Priority Data
Jun. 10, 2022 (DE) ........................ 102022205920.4

(51) Int. Cl.
*B41J 3/44* (2006.01)
*B31B 50/88* (2017.01)
(Continued)

(52) U.S. Cl.
CPC ................ *B41J 3/44* (2013.01); *B31B 50/88* (2017.08); *B31F 1/2804* (2013.01);
(Continued)

(58) Field of Classification Search
CPC .......... B41J 3/44; B41J 11/0015; B41J 15/16; B31B 50/88; B31F 1/2804; B31F 1/2822;
(Continued)

(56) References Cited

U.S. PATENT DOCUMENTS 6,059,705 A * 5/2000 Ruthenberg ............ B31B 50/00 493/34
2005/0085362 A1* 4/2005 Hutchinson ............. B31B 50/88 493/11
(Continued)

FOREIGN PATENT DOCUMENTS

CA 2684622 A1 * 11/2007 ................ B41F 5/24
CN 2573221 Y * 9/2003
(Continued)

OTHER PUBLICATIONS

PCT Search Report and Written Opinion dated Sep. 5, 2023 for related PCT Patent Application No. PCT/EP2023/060571, 7 pages.

*Primary Examiner* — Lucas E. A. Palmer
(74) *Attorney, Agent, or Firm* — Hovey Williams LLP; Kameron D. Kelly

(57) ABSTRACT

The invention relates to a method for operating a system (2) comprising a corrugator (4) and a printing machine (6), wherein the corrugator (4) has a number of processing units (8) for processing one or more paper webs (18), wherein the printing machine (6) prints a paper web and outputs same as a printed paper web (18) to the corrugator (4), wherein the system (2) has a speed controller (34) which specifies a speed of a lead machine for a number of follower machines, such that they follow the lead machine, wherein the printing machine (6) is the lead machine, wherein at least one of the processing units (8) of the corrugator (4) is a follower machine. The invention also relates to a corresponding system (2).

13 Claims, 3 Drawing Sheets

Figure 1:
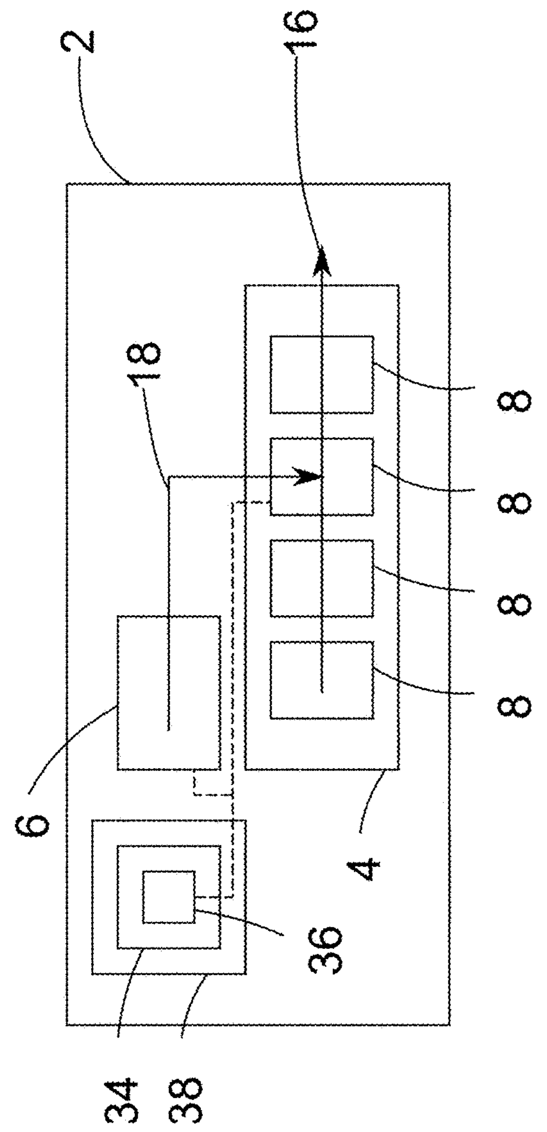

(51) Int. Cl.

| | |
|---|---|
| ***B31F 1/28*** | (2006.01) |
| ***B41J 11/00*** | (2006.01) |
| ***B41J 15/16*** | (2006.01) |
| ***B65H 21/00*** | (2006.01) |
| ***B65H 23/04*** | (2006.01) |

(52) U.S. Cl.

CPC .......... *B31F 1/2822* (2013.01); *B31F 1/2836* (2013.01); *B41J 11/0015* (2013.01); *B41J 15/16* (2013.01); *B65H 21/00* (2013.01); *B65H 23/044* (2013.01); *B65H 2301/5122* (2013.01); *B65H 2801/24* (2013.01)

(58) Field of Classification Search

CPC ..... B31F 1/2836; B65H 21/00; B65H 23/044; B65H 2301/5122; B65H 2801/24

See application file for complete search history.

(56) References Cited

U.S. PATENT DOCUMENTS

| | | | | |
|---|---|---|---|---|
| 2018/0127225 | A1* | 5/2018 | Kodama | B65H 7/02 |
| 2018/0345619 | A1* | 12/2018 | Lang | B31F 1/289 |

FOREIGN PATENT DOCUMENTS

| | | | | | |
|---|---|---|---|---|---|
| CN | 218931061 | U | * | 4/2023 | |
| DE | 102006015267 | A1 | * | 10/2007 | B31F 1/2877 |
| DE | 102017222314 | A1 | | 6/2019 | |
| JP | S603032 | U | * | 1/1985 | |
| JP | S62288038 | A | * | 12/1987 | |
| JP | S6331388 | B2 | * | 6/1988 | |
| JP | 2003001727 | A | * | 1/2003 | |
| JP | 2004209837 | A | * | 7/2004 | |
| JP | 2005014369 | A | * | 1/2005 | |
| JP | 2010149420 | A | * | 7/2010 | |
| JP | 2018108712 | A | * | 7/2018 | |
| JP | 2021172463 | A | * | 11/2021 | |

* cited by examiner

METHOD FOR OPERATING A SYSTEM HAVING A CORRUGATOR AND A PRINTING MACHINE, AND SYSTEM

RELATED APPLICATIONS

This application is a national stage application, under 35 U.S.C. § 371 of International Patent Application No. PCT/EP2023/060571, filed on Apr. 24, 2023, and published as WO 2023/237253 on Dec. 14, 2023, which claims priority to German Patent No. 102022205920.4, filed Jun. 10, 2022, which are hereby incorporated by reference in their entirety.

The invention relates to a method for operating a system which has a corrugator and a printing machine, as well as to a corresponding system.

A corrugator is used to produce corrugated cardboard. Several paper webs are unrolled from respective unwinders and are connected to each other to form a corrugated cardboard web. For this purpose, one of the paper webs is corrugated, e.g., with a corrugating roller, and then glued to two non-corrugated paper webs. Multi-layer corrugated cardboard webs with more than one corrugated paper web are also possible. The finished corrugated cardboard web is then optionally finished using the corrugated cardboard machine, i.e., cut into individual pieces.

In addition, it is possible to print one of the paper webs in advance using a printing machine in order to produce a correspondingly printed corrugated cardboard web. The paper web is first printed and then fed to the corrugator for further processing. In principle, it is possible to first roll the printed paper web into a roll, feed it into an unwinder of the corrugator, and, from there, unroll and process the roll again. However, it is desirable for the printed paper web to be transferred directly to the corrugator. However, the coordination of the printing machine with the corrugator is often problematic, especially with regard to the speed and web tension of the printed paper web.

Against this background, it is an object of the invention to improve the joint operation of a corrugator and a printing machine. For this purpose, an improved method for operating a system having a corrugator and a printing machine is to be specified. Furthermore, a corresponding system is to be provided.

The object is achieved according to the invention by a method having the features according to claim 1 and by a system having the features according to claim 13. Advantageous embodiments, further developments, and variants are the subject of the dependent claims. The explanations regarding the method also apply to the system, and vice versa. If steps of the method are specified below, advantageous embodiments of the system result from the fact that the system is designed to carry out one or more of these steps. For this purpose, the system has, in particular, a correspondingly designed control unit.

The method is used to operate a system which has a corrugator and a printing machine. The corrugator has a number of processing units for processing one or more paper webs. Suitable processing units are, for example, an unwinder for unrolling a paper web, a splicer for providing a continuous paper web, in particular in combination with an unwinder, a corrugating roller for producing a corrugated paper web, a gluing unit for applying glue to a paper web for the purpose of joining it to another paper web, a preheater for preheating a paper web, a single facer for joining a corrugated paper web to a non-corrugated paper web to form a single-sided corrugated cardboard web, a double facer for joining a single-sided corrugated cardboard web to a non-corrugated paper web to form a corrugated cardboard web, and the like. Depending upon the design of the corrugator, the processing units mentioned may be present once, multiple times, or not at all.

The printing machine prints a paper web and outputs it as a printed paper web to the corrugator for further processing into a corrugated board web. The term "printed paper web" is used to simplify the description of the paper web that passes through the printing machine and is printed upon by said printing machine. Preferably, the printed paper web serves as a laminating web for the corrugated cardboard web, i.e., as an outermost layer thereof.

Preferably, the printing machine is a digital printer. Such a design is assumed below without any restriction of generality. In a suitable embodiment, the printing machine has a printing cylinder and a number of printing bars in order to print an incoming paper web. The printing cylinder is in particular a part of a printing unit, which in turn is a processing unit of the printing machine. "A number of" is generally understood to mean "one or more." The incoming paper web is provided, for example, by a combination of an unwinder and a splicer. A design with several printing cylinders and associated printing bars, through which the paper web passes successively, is also suitable. For example, a number of inks are first printed using a first combination of printing cylinder and printing bars, e.g., four-color (CMYK), and then a varnish is printed using a second combination of printing cylinder and printing bars. The mentioned printing cylinder for printing ink is also called an inkjet printing cylinder; analogously, the printing cylinder for printing varnish is also called a varnish printing cylinder. In addition, the printing machine expediently has one or more application units, e.g., for primer or varnish, and/or one or more dryers, e.g., hot air dryers or IR dryers, for drying the print.

The spatial arrangement of the printing machine relative to the corrugator is, in principle, arbitrary. What is important is that the printed paper web be fed directly into the corrugator, i.e., not first rolled up and then unrolled again in the corrugator. In the present case, without loss of generality, an arrangement is assumed in which the printing machine is arranged parallel to the corrugator, wherein the printed paper web is then introduced into the corrugator via a number of, for example, two, turning bars. In principle, however, an inline arrangement is also suitable. Preferably, the printed paper web is fed into the corrugator via a combination of an unwinder and a splicer, so that the printing machine can optionally be decoupled from the corrugator and switched off, and then another paper web be fed in via the unwinder.

The system has a speed controller which specifies a speed of a lead machine for a number of follower machines so that they follow the lead machine. The speed is in particular a conveying speed or a web speed, and then a speed of a respective paper web within the system, especially the printed paper web and the corrugated cardboard web as a whole. The speed controller then specifies the overall speed of the lead machine as the target speed for the follower machines and controls these follower machines accordingly.

In the present case, the printing machine is the lead machine, and at least one of the processing units of the corrugator is a follower machine; preferably, all processing units of the corrugator are each a follower machine, so that the corrugator completely follows the printing machine, at least with respect to speed control. This has the advantage that the printing machine can be defined as the resting point of the system and can therefore be operated at a constant speed. This means that the printing machine achieves a significantly improved printing result, especially in comparison to the opposite case, in which the printing machine as follower machine follows the corrugator as the lead machine. Such a design with the printing machine as a follower machine is possible per se and has the advantage that its combination with a corrugator is particularly simple, since the corrugator does not need to be modified further and can be operated as usual; the printing machine simply replaces one of the unwinders of the corrugator for feeding the paper web. For example, a given corrugator already has a speed controller in which the double facer sets the target speed, which is adopted by the other processing units and then also any additional printing machine. However, this, so to speak, natural solution is deliberately abandoned in this case. This can improve the printing result. In addition, with the printing machine as the lead machine, any tension control or dancer for adjusting the speed of the printing machine to the corrugator can be dispensed with, which makes the construction of the system simpler in this respect.

As already indicated, the printing machine is preferably operated at a constant speed and then advantageously forms a resting point for the entire system. In a suitable embodiment for this purpose, the printing machine for printing the paper web has a printing cylinder, in particular an inkjet printing cylinder as already described, which is controlled to a constant speed (=predetermined speed) by the speed controller, in particular during web transport, which is a first operating mode. This ensures that the paper web runs as smoothly as possible during printing. The speed controller then contains two controls, so to speak: with a first control, the speed of the printing machine is controlled to a constant value; with a second control, the corrugator is then controlled to the speed of the printing machine.

Preferably, the speed controller provides a virtual guide axis which the printing machine, especially the described printing cylinder, follows. The virtual guide axis is not an actual axis of the printing machine, but is provided purely electronically by a control unit of the system and is parameterized accordingly. The use of a virtual guide axis has the advantage over a real guide axis (e.g., encoder) that the virtual guide axis generates a particularly smooth, i.e., not only low-noise, but even noiseless, sensor signal for control. In this case, a "real guide axis" is understood to mean in particular that the system follows a measured speed (sensor signal). However, the details of the virtual guide axis are of secondary importance in this case; what is important is that one is used at all. Preferably, the control unit that provides the virtual guide axis is part of the printing machine, and is then also referred to as printer control. Accordingly, the virtual guide axis is then passed on from the printer control via a suitable signal path to a control unit of the corrugator (also known as WPA control) in order to control the speed of the individual processing units accordingly. However, the distribution of the control units and the control tasks to the printing machine and the corrugator, or even separately, is possible in principle. Therefore, without restricting its generality, we will refer here only to the "control unit of the system."

However, the virtual guide axis is not completely independent, in that the speed to which the printing cylinder is controlled (i.e., the target speed) is predetermined, suitably by the corrugator, e.g., automatically as part of a setting for carrying out a specific order, or manually by a machine operator. If, for example, the speed of the corrugator needs to be changed when an order is changed and a corresponding speed is entered or set, the speed for the virtual guide axis is changed, so that the corrugator is then also operated at a correspondingly changed speed. In this way, the control structure and operating concept, in which order-dependent changes are made to the corrugator, are, advantageously, retained.

The printing cylinder, in particular the inkjet printing cylinder, of the printing machine follows the virtual guide axis preferably without a process control, and is thus excluded from any web transport control, i.e., control of the web tension of the paper web. However, such a web transport control is, expediently, a part of the corrugator, i.e., in one or more of the processing units of the corrugator, the web tension of the various paper webs is controlled by means of a web transport control. The web tension is preferably controlled separately in each processing unit. At least the printing cylinder is preferably excluded from this web transport control, but other portions of the printing machine aside from the printing cylinder are optionally connected to the web transport control, in order to control the web tension within the printing machine (but apart from the printing cylinder) and between the printing machine and the corrugator. Accordingly, a web transport control concept has been implemented for the entire system, in which the web tension is controlled on different portions of the system, but with the exception of the printing cylinder in particular. This is only controlled by the speed controller, which the corrugator then follows, so that the web transport control is also dependent upon the speed controller. The printing cylinder follows the virtual guide axis, as do all other drives in the system, wherein, in contrast to the printing cylinder, these other drives still adjust their speed through the web transport control, i.e., through the control value of a process control, e.g., for web tension or dancer.

Preferably, the drives follow the virtual guide axis at a synchronized angle. This means in particular that, in addition to the speed controller, a position controller is also active. If an actual speed deviates from a target speed, this results in a position error, which is then corrected by a position control.

In summary, it is therefore advantageous to use a specification for the speed of the corrugator as the speed for the printing machine, which the corrugator then follows, while, at the same time, the web tension is controlled; the printing cylinder, however, is excluded from this. This design is particularly suitable for web transport, i.e., for conveying the paper web through the system during the production of a corrugated cardboard web. During web transport, the paper web is therefore conveyed. The web transport is (as already mentioned above) a first operating mode of the system, which serves for the actual production of a corrugated cardboard web.

In the case of several printing cylinders, not all printing cylinders are necessarily excluded from the web transport control during web transport. In a preferred embodiment, only the inkjet printing cylinder is excluded from the web transport control, while the varnish printing cylinder is connected to it.

In principle, the system advantageously has, as part of the web tension control concept, one or more pairs of rollers over which the printed paper web is conveyed one after the other and with which a web tension of the printed paper web is controlled before it runs into the corrugator downstream of the printing machine. Each pair of rollers has a measuring roller (undriven) for measuring the web tension (actual value) and a control roller (driven) for adjusting the web tension to a target value. Control rollers used include, for example, cooling rollers, heating rollers, temperature-control rollers, press rollers, positioning rollers, or the previously mentioned printing cylinders. A wide variety of designs are suitable for arranging the roller pairs along the paper web. The measuring roller of a roller pair can also be arranged either upstream or downstream of the control roller of the roller pair. Preferably, however, there is no measuring roller or control roller of a second roller pair between the non-driven measuring roller and the driven control roller of a first roller pair.

In contrast to web transport, for simple tensioning of the paper web, an embodiment is advantageous in which, deviating from what has been said so far, the control of the web tension is changed, specifically by using one or more printing cylinders of the printing machine to control the web tension in the printing machine. However, the paper web is only tensioned, and not conveyed. Tensioning is a second operating mode of the system. In principle, the same control and thus the same control direction as for web transport can be used for tensioning. However, a change in the control, in particular in such a way that the printing cylinder of the printing unit is now used, is particularly advantageous when the printed paper web is prepared for splicing via a splicer (in particular, a laminating web splicer). During web transport, the printing machine (more precisely, the printing unit, and even more precisely, its printing cylinder) forms a resting point. The control is then changed in such a way that the printing machine is no longer the resting point of the system, but instead the splicer, by reversing the control direction, so to speak. In this way, tensioning takes place in preparation for splicing. This makes it possible to tension the paper web, which is clamped to the splicer for splicing, upstream and through the printing machine. The splicer forms a first clamping point; a second clamping point is arranged upstream along the paper web and is formed, for example, by another splicer at the entrance to the printing machine. In contrast to web transport, during tensioning of the printing cylinder, in particular of the inkjet printing cylinder, there is a control roller which, together with a measuring roller, forms a pair of rollers for controlling the web tension. The measuring roller is in particular also a part of the printing machine.

In a suitable embodiment, the system has several measuring rollers and control rollers, and these are arranged alternately along the printed paper web, so that there is a control roller between two measuring rollers, and, vice versa, there is a measuring roller between two control rollers. By changing the assignment of the measuring rollers and control rollers to each other in roller pairs, the control direction of each roller pair for web tension control can be changed. Preferably, all pairs of rollers in front of the printing cylinder (in particular, inkjet printing cylinders) are the same during web transport and during tensioning, i.e., upstream of the printing cylinder, the control direction remains unchanged. Advantageously, however, from the printing cylinder and downstream thereof for tensioning (especially for the preparation of the splicing of the printed paper web as described above), the control direction is reversed compared to the web transport. For this purpose, a different measuring roller is assigned to each control roller (or vice versa). For example, the roller pairs, starting from the printing cylinder and downstream of it, during web transport, are formed in such a way that the control roller of a respective roller pair is located downstream of the associated measuring roller. For tensioning, a measuring roller is then assigned to the respective control roller upstream of this control roller. This measuring roller may have previously been the measuring roller of another roller pair during web transport. Preferably, for tensioning purposes, all roller pairs are formed in such a way that, in each roller pair, the control roller is located downstream of the associated measuring roller, so that the control takes place on the whole in only one direction, towards the entrance of the printing machine. Based upon this, during web transport, the roller pairs from the printing cylinder (inkjet printing cylinder) and downstream thereof are preferably formed in such a way that the control roller is located upstream of the associated measuring roller. As a result, the control takes place on the whole starting from the printing cylinder in opposite directions and away from the printing cylinder (i.e., upstream of it in the upstream direction and downstream of it in the downstream direction).

As already mentioned above, the corrugator is conveniently controlled starting from its double facer (also called the tensioning and heating part). Accordingly, all other processing units of the corrugator preferably follow the double facer with respect to the speed controller. In other words, the speed of the other processing units is controlled depending upon the speed of the double facer. This basic concept is preferably retained here, with the difference that now the double facer does not independently specify the speed, but follows the printing machine in this respect as described—in particular, the speed which is specified by the virtual guide axis. Since the other processing units now continue to follow the double facer, the corrugator as a whole is a follower machine of the printing machine. In other words, the double facer, which was previously used as a master, now follows the printing machine and is therefore only a master for the corrugator, but not for the system as a whole. The printing cylinder of the printing machine is now the master for the entire system.

Since the double facer is now to follow the printing machine, an additional adjustment of the web tension between the printing machine and the corrugator is particularly useful, because the speed of the double facer, which was not previously controlled, is now controlled in order to be adapted to the speed specified by the printing machine. This also applies quite generally if a processing unit other than the double facer was previously the master.

In order to adjust the web tension between the printing machine and the corrugator, in a suitable embodiment with the double facer, the web tension of the printed paper web is controlled on a last portion before the double facer. In this way, it is also advantageous to adjust the speed when entering the corrugator, and especially in the previously uncontrolled double facer. To control the web tension on the last portion, the system has a pair of rollers, with a control roller for adjusting the web tension on the last portion and a measuring roller for measuring the web tension on the last portion. Either the control roller is part of the double facer, and the measuring roller is located outside and upstream of it, or vice versa. The term “last portion” refers to the portion between the measuring roller and the control roller. As an alternative to the described solution with a pair of rollers, a dancer between the double facer and the printing machine is also suitable for adjusting the web tension.

In a suitable design, feedback of the control loop is realized with a dancer position or, alternatively, with a web tension measurement. Depending upon the design selected, the measuring roller used is arranged at different positions. In a suitable embodiment, a splicer is present between the printing machine and the corrugator (more precisely, its double facer), so the dancer position is preferably used to adjust the speed of the corrugator or the double facer. However, if no such splicer is available at the specified position, it is expedient to use a web-tension measuring roller to adjust the specified speed.

It is particularly advantageous to use a splicer to adjust the speed when entering the double facer. In a suitable embodiment, the corrugator has a corresponding splicer which is arranged along the printed paper web between the printing machine and the double facer, i.e., downstream of the printing machine and upstream of the double facer. The splicer has a measuring roller with which the web tension is measured, in order to then be controlled by the double facer, in particular with a control roller as described. The splicer is in particular combined with an unwinder, via which the printed paper web is then fed into the corrugator, wherein another paper web can then be fed in if required by means of the unwinder and the splicer.

A system according to the invention has a control unit (in particular, as already described above) which is designed to carry out a method as described above.

Figure 2:
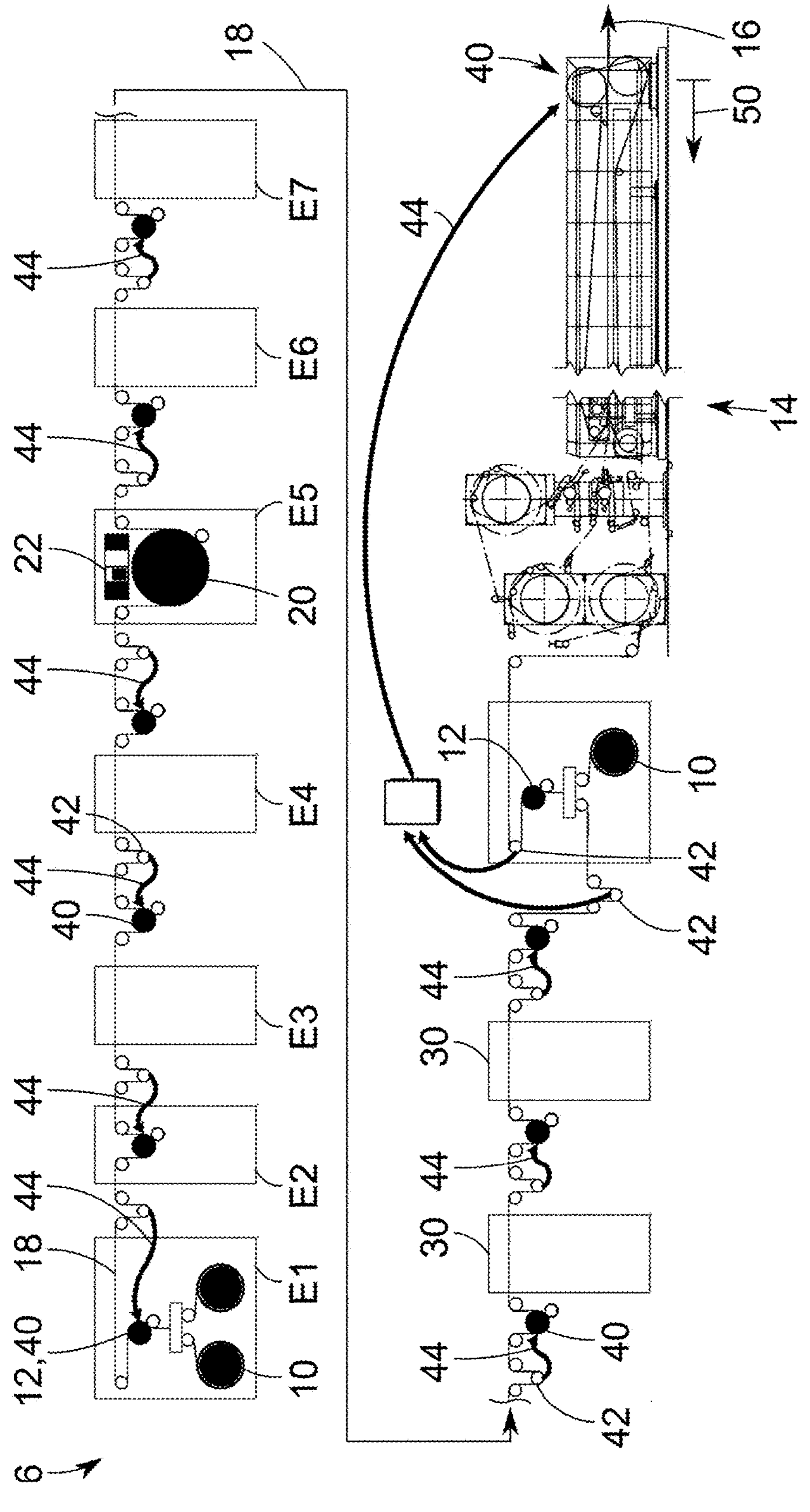
Figure 3:
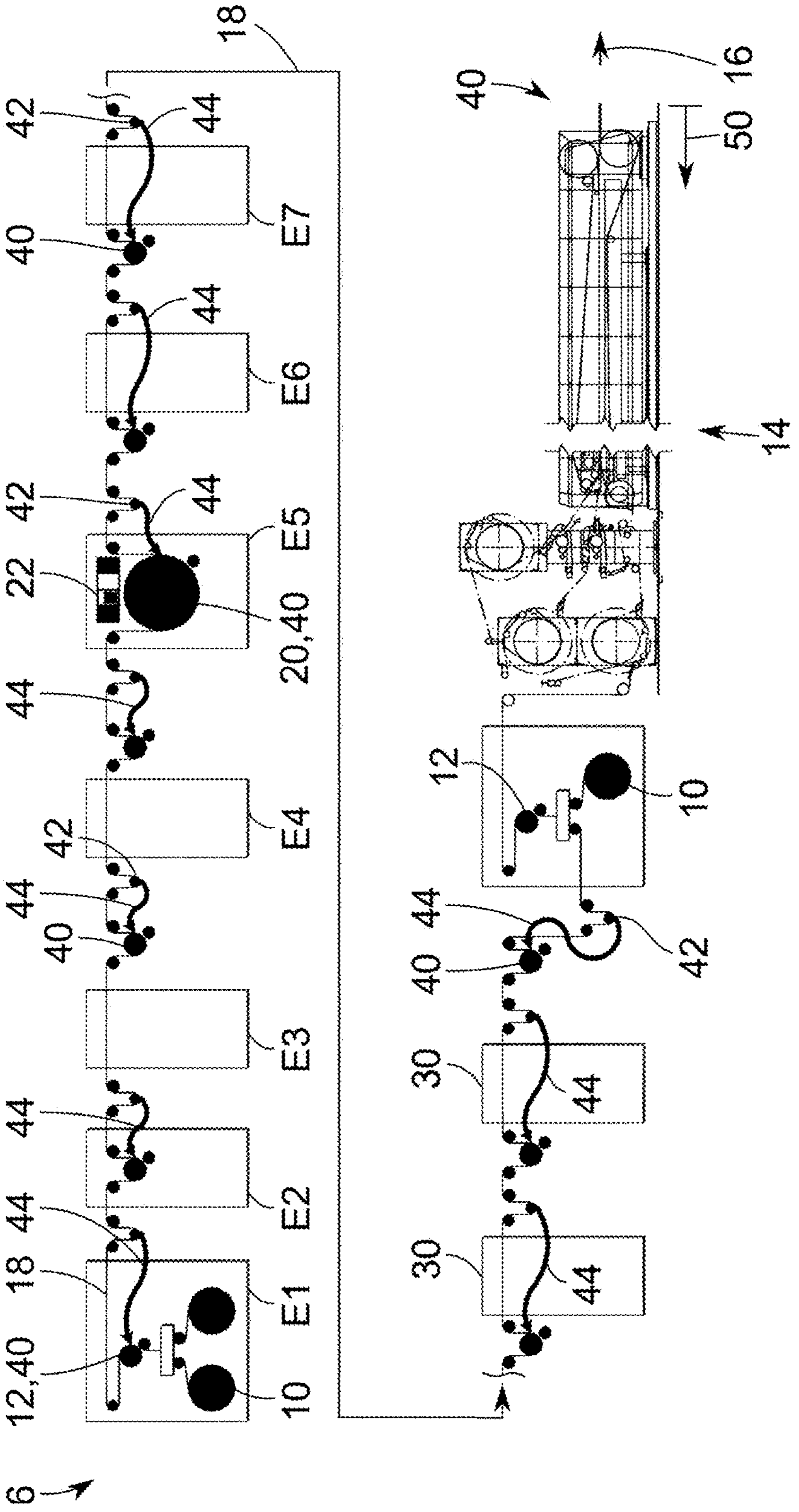

In the following, exemplary embodiments of the invention are explained in greater detail with reference to a drawing. The drawing shows schematically:

FIG. 1 a system,

FIG. 2 a cutout of the system from FIG. 1 in detail in a first operating mode, FIG. 3 the cutout of the system according to FIG. 2 in a different operating mode.

FIG. 1 shows a highly simplified system 2 which has a corrugator 4 and a printing machine 6. The corrugator 4 has a number of processing units 8 for processing one or more paper webs. Suitable processing units 8 are, for example, an unwinder 10 for unrolling a paper web, a splicer 12 for providing a continuous paper web, a corrugating roller, a gluing unit, a preheater, a single facer, a double facer 14 for joining a single-sided corrugated cardboard web to a non-corrugated paper web to form a corrugated cardboard web 16, and the like.

The printing machine 6 prints a paper web and outputs it as a printed paper web 18 to the corrugator 4 for further processing into the corrugated board web 16. The term "printed paper web" is used to simplify the description of the paper web that passes through the printing machine 6 and is printed on by said printing machine.

In the exemplary embodiment shown, the printing machine 6 is a digital printer. An exemplary embodiment of the printing machine 6 can be seen in FIGS. 2 and 3, which each show portions of the system 2 in different operating modes. Of the corrugator 4, only an unwinder 10, a splicer 12, and a double facer 14 are shown in FIGS. 2 and 3, via which the printed paper web 18 is fed to the corrugator 4. The printing machine 6 here has, for example, two printing cylinders 20 and a number of printing bars 22 in order to print the incoming paper web 18. The incoming paper web 18 is provided here by a combination of an unwinder 10 and a splicer 12; this combination is also referred to as an unrolling and splicing unit E1 and forms an entrance of the printing machine 6. Downstream of this is an optional inlet tension group E2, downstream of this an optional corona pretreatment E3, downstream of this an optional precoating E4, and downstream of this then a printing unit E5 with the first printing cylinder 20 (inkjet printing cylinder) and printing bars 22 for printing a number of inks. Downstream of this, an optional varnishing E6 is carried out first, and downstream of this an optional digital printing varnishing E7 with a second, not explicitly shown, printing cylinder 20 (varnish printing cylinder) and printing bars 22.

The spatial arrangement of the printing machine 6 relative to the corrugator 4 is basically arbitrary; in FIG. 1, for example, the printing machine 6 is arranged parallel to the corrugator 4, wherein the printed paper web 18 is then introduced into the corrugator 4 via a number of turning bars 30. In FIGS. 2 and 3, only two turning bars 30 are shown as examples, but the number can vary; a design without turning bars 30 is also possible. In the present case, the printed paper web 18 is then fed to the corrugator 4 via a combination of an unwinder 10 and a splicer 12, so that the printing machine 6 can optionally also be decoupled from the corrugator 4 and switched off, and then another paper web is fed to the corrugator 4 by means of the unwinder 10.

The system 2 has a speed controller 34 which specifies a speed of a lead machine for a number of follower machines so that they follow the lead machine. The speed is a conveying speed or a web speed, and then a speed of a respective paper web within the system 2, especially also the printed paper web 18 and the corrugated cardboard web 16 as a whole. The speed controller 34 specifies the overall speed of the lead machine as the target speed for the follower machines and controls these follower machines accordingly. In the present case, the printing machine 6 is the lead machine, and at least one of the processing units 8 of the corrugator 4 is a follower machine. In the present case, the corrugator 4 even follows the printing machine 6 completely, at least with respect to speed control.

The printing machine 6 is accordingly operated at a constant speed and then forms a resting point for the entire system 2. For this purpose, one of the printing cylinders 20 (in this case the first printing cylinder 20 of the printing unit E5) is controlled to a constant speed using the speed controller 34. In the exemplary embodiment shown, the speed controller 34 also provides a virtual guide axis 36, which the printing machine 6, especially its printing cylinder 20, follows. In FIG. 1, a control unit 38 of the system 2 is shown, which contains the speed controller 34 with the virtual guide axis 36. In principle, it is possible for the control unit 38 to be integrated into the printing machine 6 or into the corrugator 4, or to be divided between them.

However, the virtual guide axis 36 is not completely independent, in that the speed to which the printing cylinder 20 is controlled is predetermined, e.g., by the corrugator 4. If, for example, the speed of the corrugator 4 needs to be changed when an order is changed and a corresponding speed is entered or set, the speed for the virtual guide axis 36 is changed, so that the corrugator 4 is then operated at a correspondingly changed speed.

The first printing cylinder 20 of the printing machine 6 follows the virtual guide axis 36 without a process controller, and is thus excluded from any web transport control, i.e., control of the web tension of the paper web 18. However, such a web transport control is in the present case a part of the corrugator 4, i.e., the web tension of the various paper webs is controlled by means of a web transport control in the processing units 8 of the corrugator 4. At least the first printing cylinder 20 (inkjet printing cylinder) is excluded from this web transport control, but other portions of the printing machine 6 apart from the printing cylinder 20 are optionally connected to the web transport control—in this case, also the second printing cylinder 20 (varnish printing cylinder). Accordingly, a web transport control concept has been implemented for the entire system, in which the web tension is controlled on different portions of the system 2, but with the exception of the printing cylinder 20 in particular. This is controlled only by the speed controller 34, which the corrugator 4 then follows, so that the web transport control is also dependent upon the speed controller 34. This design is suitable for web transport, i.e., for conveying the paper web 18 through the system 2 during the production of a corrugated cardboard web 16. This web transport is a first operating mode of system 2 and is shown in FIG. 2.

In principle, the system 2 advantageously has, as part of the web tension control concept, one or more pairs of rollers over which the printed paper web 18 is conveyed one after the other and with which a web tension of the printed paper web 18 is controlled before it runs into the corrugator 4 downstream of the printing machine 6. The roller pairs are marked in FIGS. 2 and 3 by arrows 44, wherein each arrow 44 begins at the measuring roller 42 of a roller pair and ends with the tip at the control roller 40 of the roller pair. For the sake of clarity, not all control rollers 40 and measuring rollers 42 have been explicitly provided with reference signs, but their position and function can be clearly seen from the arrows 44 and their course. The course of the arrows 44, i.e., their orientation either in the upstream direction or downstream direction, indicates the respective set control direction of the roller pair. As can be seen in the comparison of FIGS. 2 and 3, the control direction can be changed by changing the assignment of the measuring rollers 42 and control rollers 40 to roller pairs. The respective control roller 40 is a driven roller, and the respective measuring roller 42 is an undriven roller. Control rollers 40 used include, for example, cooling rollers 46, heating rollers, temperature-control rollers, press rollers, positioning rollers, or the previously mentioned printing cylinders 20. A wide variety of designs are suitable for the arrangement of the roller pairs along the paper web 18; a possible exemplary embodiment is shown in FIGS. 2 and 3.

In contrast to the web transport, the printing cylinders 20 are used for simply tensioning the paper web 18, especially the printing cylinder 20 of the printing unit E5 shown explicitly here, in order to control the web tension in the printing machine 6. In this case, the paper web 18 is only tensioned, and not conveyed. Tensioning is a second operating mode of the system 2, and an exemplary embodiment thereof is shown in FIG. 3. The measuring rollers 42 and control rollers 40 are basically arranged alternately along the printed paper web 18, such that a control roller 40 is located between two measuring rollers 42, and, vice versa, a measuring roller 42 is located between two control rollers 40. By changing the assignment of the measuring rollers 42 and control rollers 40 to each other in roller pairs, the control direction for web tension control can be changed. In FIGS. 2 and 3, all roller pairs upstream of the printing cylinder 20 shown have the same control direction during web transport and tensioning, i.e., upstream of the printing cylinder 20, the control direction remains unchanged. However, as can be seen in FIG. 3, from the printing cylinder 20 and downstream thereof, for tensioning, the control direction is reversed compared to the web transport in FIG. 2. For this purpose, a different measuring roller 42 is assigned to a respective control roller 40 (or vice versa), specifically in such a way that the explicitly shown printing cylinder 20 is also used as a control roller 40. According to FIG. 2, the roller pairs starting from the printing cylinder 20 and downstream of it during web transport are formed in such a way that the control roller 40 of a respective roller pair is located downstream of the associated measuring roller 42. For tensioning, a measuring roller 42 is then assigned to the respective control roller 40 upstream of the control roller 40, as shown in FIG. 3. This measuring roller 42 may have previously been the measuring roller 42 of another roller pair during web transport. In the present case, for tensioning purposes, all roller pairs are even formed in such a way that, in each roller pair, the control roller 40 is located downstream of the associated measuring roller 42, so that the control takes place on the whole in only one direction, towards the entrance of the printing machine 6. Based upon this, during web transport, the roller pairs from the printing cylinder 20 and downstream thereof are in the present case formed in such a way that the control roller 40 is located upstream of the associated measuring roller 42. As a result, the control takes place on the whole starting from the printing cylinder 20 in opposite directions and away from the printing cylinder 20 (i.e., upstream of it in the upstream direction and downstream of it in the downstream direction).

The corrugator 4 is controlled in the present case starting from the double facer 14. Accordingly, all other processing units 8 of the corrugator 4 follow the double facer 14 with respect to the speed controller 34. Since the double facer 14 now follows the printing machine 6, an additional adjustment of the web tension between the printing machine 6 and the corrugator 4 is required, because the speed of the double facer 14, which was not previously controlled, is now controlled in order to be adapted to the speed specified by the printing machine 6. This also applies quite generally if a processing unit 8 other than the double facer 14 was previously a master of the corrugator 4.

In order to adjust the web tension between the printing machine 6 and the corrugator 4, in the shown exemplary embodiment with the double facer 14, a web tension of the printed paper web 18 is controlled on a last portion 50 before the double facer 14. In this way, an adjustment of the speed when entering the corrugator 4 is realized. To control the web tension on the last portion 50, the system 2 has a pair of rollers, with a control roller 40 for adjusting the web tension on the last portion 50 and a measuring roller 42 for measuring the web tension on the last portion 42. In FIG. 2, the control roller 40 is part of the double facer 14.

As can be seen in FIG. 2, two positions are suitable for the associated measuring roller 42 of the roller pair: a first possible measuring roller 42 is located between the corrugator 4 and the turning bar 30 upstream of the splicer 12, and a second possible measuring roller 42 is located downstream of the splicer 12 or is a part thereof. The term "last portion" 50 refers to the portion between the respective measuring roller 42 and the control roller 40. Although both of the described measuring rollers 42 are shown in FIG. 2, typically only one is used, depending upon whether the splicer 12 is present or absent.

LIST OF REFERENCE SIGNS

2 system
4 corrugator
6 printing machine
8 processing units
10 unwinder
12 splicer
14 double facer
16 corrugated cardboard web
18 printed paper web
20 printing cylinder
22 printing bar
30 turning bar
34 speed controller
36 virtual guide axis
38 control unit
40 control roller
42 measuring roller
44 arrow (to mark a roller pair)
50 last portion E1 unwinding and splicing unit
E2 inlet tension group
E3 corona pretreatment
E4 precoating
E5 printing unit
E6 varnishing
E7 digital printing varnish

The invention claimed is:

1. Method for operating a system which has a corrugator and a printing machine, wherein the corrugator has a number of processing units for processing one or more paper webs, wherein the printing machine prints a paper web and outputs same as a printed paper web to the corrugator, wherein the system has a speed controller which specifies a speed of a lead machine for a number of follower machines, such that they follow the lead machine, wherein the printing machine is the lead machine, wherein at least one of the processing units of the corrugator is a follower machine.

2. Method according to claim 1, wherein the printing machine for printing the paper web has a printing cylinder which is controlled to a constant speed by the speed controller.

3. Method according to claim 2, wherein the printing cylinder is used to control the web tension in the printing machine to tension the paper web, wherein the paper web is only tensioned and not conveyed.

4. Method according to claim 1, wherein the speed controller provides a virtual guide axis which the printing machine follows.

5. Method according to claim 1, wherein the system has one or more pairs of rollers over which the printed paper web is conveyed and with which a web tension of the printed paper web is controlled before it runs into the corrugator downstream of the printing machine.

6. Method according to claim 5, wherein each pair of rollers has a control roller and a measuring roller, wherein, for tensioning purposes, all roller pairs are formed in such a way that, in each roller pair, the control roller is located downstream of the associated measuring roller, and wherein, starting from this, during web transport, the roller pairs from the printing cylinder and downstream thereof are formed in such a way that the control roller is located upstream of the associated measuring roller.

7. Method according to claim 5, wherein, during web transport, the printing machine forms a resting point, and, in order to prepare for splicing with a splicer, the control of the web tension is changed in such a way that the printing machine no longer forms the resting point of the system, but the splicer.

8. Method according to claim 1, wherein one of the processing units of the corrugator is a double facer to which the printed paper web is fed.

9. Method according to claim 8, wherein all remaining processing units of the corrugator follow the double facer with respect to the speed controller.

10. Method according to claim 8, wherein the double facer controls a web tension of the printed paper web on a last portion before the double facer.

11. Method according to claim 10, wherein the corrugator has a splicer which is arranged between the printing machine and the double facer, wherein the splicer has a measuring roller with which the web tension is measured in order to then be controlled by the double facer.

12. Method according to claim 1, wherein the printing machine is a digital printer.

13. System having a control unit designed to carry out a method according to claim 1.

* * * * *